(12) United States Patent
Shigihara

(10) Patent No.: US 9,174,681 B2
(45) Date of Patent: Nov. 3, 2015

(54) VEHICLE BODY FRONT SECTION STRUCTURE

(75) Inventor: Takayoshi Shigihara, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/813,781

(22) PCT Filed: Jan. 16, 2012

(86) PCT No.: PCT/JP2012/050723
§ 371 (c)(1),
(2), (4) Date: Feb. 1, 2013

(87) PCT Pub. No.: WO2013/108353
PCT Pub. Date: Jul. 25, 2013

(65) Prior Publication Data
US 2014/0319880 A1    Oct. 30, 2014

(51) Int. Cl.
*B62D 21/03* (2006.01)
*B62D 25/08* (2006.01)
*B62D 21/15* (2006.01)
*B62D 21/09* (2006.01)
*B62D 21/11* (2006.01)
*B62D 25/14* (2006.01)

(52) U.S. Cl.
CPC ........... *B62D 25/08* (2013.01); *B62D 21/155* (2013.01); *B62D 21/03* (2013.01); *B62D 21/09* (2013.01); *B62D 21/11* (2013.01); *B62D 25/14* (2013.01)

(58) Field of Classification Search
CPC .... B62D 25/082; B62D 21/11; B62D 25/085; B62D 21/07; B62D 21/06; B62D 21/03; B62D 21/09

USPC ................................................. 280/124.109
See application file for complete search history.

(56) References Cited

U.S. PATENT DOCUMENTS

| | | | | |
|---|---|---|---|---|
| 4,392,545 A | * | 7/1983 | Harasaki et al. | 180/294 |
| 4,753,315 A | * | 6/1988 | Fujisaki et al. | 180/299 |
| 5,641,180 A | * | 6/1997 | Kamei et al. | 280/781 |
| 6,109,629 A | * | 8/2000 | Bortz et al. | 280/124.109 |
| 6,402,172 B1 | | 6/2002 | Suzuki | |
| 6,808,197 B2 | * | 10/2004 | Bauer et al. | 280/728.3 |
| 7,232,005 B2 | * | 6/2007 | Komatsu et al. | 180/299 |
| 7,919,036 B2 | * | 4/2011 | Bauer et al. | 264/400 |

(Continued)

FOREIGN PATENT DOCUMENTS

| | | |
|---|---|---|
| CN | 101045464 | 10/2007 |
| EP | 1 840 001 | 10/2007 |

(Continued)

*Primary Examiner* — Karen Beck
(74) *Attorney, Agent, or Firm* — Finnegan, Henderson, Farabow, Garrett & Dunner, LLP

(57) ABSTRACT

In a vehicle body front section structure according to the present invention, as well as a pair of left and right front side support portions and a pair of left and right rear side support portions that support a suspension member from the vehicle body, the suspension member is also coupled to a dash panel by coupling members. The coupling members are provided in the vehicle front-rear direction between the pair of left and right front side support portions and the pair of left and right rear side support portions, and provided in the vehicle width direction between the front side support portion and rear side support portion on the vehicle left side and the front side support portion and rear side support portion on the vehicle right side.

2 Claims, 7 Drawing Sheets

(56) References Cited

U.S. PATENT DOCUMENTS

| | | | |
|---|---|---|---|
| 7,988,184 B2* | 8/2011 | Fukawatase et al. | 280/728.3 |
| 9,010,849 B2* | 4/2015 | Komiya et al. | 296/204 |
| 2001/0010423 A1* | 8/2001 | Bauer et al. | 280/728.3 |
| 2002/0109324 A1 | 8/2002 | Kawamura et al. | |
| 2003/0107203 A1* | 6/2003 | Bauer et al. | 280/728.3 |
| 2004/0046381 A1* | 3/2004 | Yoshida et al. | 280/784 |
| 2005/0127717 A1* | 6/2005 | Uchida | 296/203.02 |
| 2007/0207233 A1* | 9/2007 | Bauer et al. | 425/141 |
| 2007/0284175 A1 | 12/2007 | Misaki et al. | |
| 2011/0049937 A1 | 3/2011 | Fujii et al. | |
| 2011/0198889 A1 | 8/2011 | Takeshita et al. | |
| 2014/0217782 A1* | 8/2014 | Mohrlock et al. | 296/204 |
| 2014/0319880 A1* | 10/2014 | Shigihara | 296/193.09 |

FOREIGN PATENT DOCUMENTS

| | | |
|---|---|---|
| EP | 1 916 130 | 4/2008 |
| JP | 1-65769 | 6/1989 |
| JP | 8-133125 | 5/1996 |
| JP | 8-142908 | 6/1996 |
| JP | 2001-088736 | 4/2001 |
| JP | 2002-137615 | 5/2002 |
| JP | 2002-347648 | 12/2002 |
| JP | 2004-098799 | 4/2004 |
| JP | 2007-261460 | 10/2007 |
| JP | 2008-18901 | 1/2008 |
| JP | 2008-174179 | 7/2008 |
| JP | 2008-290539 | 12/2008 |
| JP | 2010-064637 | 3/2010 |

* cited by examiner

VEHICLE BODY FRONT SECTION STRUCTURE

CROSS-REFERENCE TO RELATED APPLICATIONS

This application is a national phase application on International Application No. PCT/JP2010/050723, filed Jan. 16, 2012, the content of which is incorporated herein by reference.

TECHNICAL FIELD

The present invention relates to a vehicle body front section structure.

BACKGROUND ART

Vehicle body front section structures are known that are equipped with a suspension member (front sub-frame) supported from the vehicle body at positions at four front-rear and left-right locations (see for example Patent Document 1).

Patent Document 1: Japanese Patent Application Laid-Open (JP-A) No. 2008-18901
Patent Document 2: JP-A No. 2008-174179
Patent Document 3: JP-A No. 2007-26140
Patent Document 4: JP-A No. 8-142908
Patent Document 5: JP-A No. 8-133125

DISCLOSURE OF INVENTION

Technical Problem

However, in such structures, there is the concern of transmission of resonant vibration of the suspension member that occurs when the engine vibrates to the vehicle body when an engine is connected to the suspension member. There is also the concern that the crushable stroke of the vehicle body front section during a vehicle front-side collision might be suppressed if the cross-sectional strength of the suspension member is increased in order to suppress resonant vibration of the suspension member.

In consideration of the above circumstances, an object of the present invention is to provide a vehicle body front section structure that can suppress resonant vibration of the suspension member whilst still securing the crushable stroke of the vehicle body front section.

Solution to Problem

In order to address the above issues, a vehicle body front section structure according to a first aspect of the present invention includes: a suspension member that supports left and right suspension devices, and that is coupled to an engine disposed in a vehicle body front section; a pair of left and right front side support portions that respectively support left and right front side portions of the suspension member from a vehicle body; a pair of left and right rear side support portions that respectively support left and right rear side portions of the suspension member from the vehicle body; and coupling members that are provided in a vehicle front-rear direction between the pair of left and right front side support portions and the pair of left and right rear side support portions, and that are provided in a vehicle width direction between the front side support portion and rear side support portion on a vehicle left side, and between the front side support portion and rear side support portion on a vehicle right side, each of the coupling members including a plate shaped portion that is fixed to the suspension member and that extends in a vehicle top-bottom direction with a plate thickness direction of the plate shaped portion oriented in the vehicle front-rear direction, and a fixing portion that is fixed to the vehicle body and that extends from a top end portion of the plate shaped portion towards a vehicle rear side or a vehicle front side.

According to this vehicle body front section structure, as well as the pair of left and right front side support portions and the pair of left and right rear side support portions that support the suspension member from the vehicle body, the suspension member is also coupled to the vehicle body by the coupling members. The coupling members are provided in the vehicle front-rear direction between the pair of left and right front side support portions and the pair of left and right rear side support portions, and provided in the vehicle width direction between the front side support portion and rear side support portion on the vehicle left side and the front side support portion and rear side support portion on the vehicle right side. In other words, the coupling members are provided at an antinode portion in resonant vibration of the suspension member when the pair of left and right front side support portions and the pair of left and right rear side support portions act as pivot points (nodes). Accordingly, since the bending rigidity of the suspension member is enhanced by the coupling members, occurrence of resonant vibration of the suspension member as the engine vibrates can be suppressed by the coupling members even when the engine is connected to the suspension member.

Moreover, each of the coupling members includes the plate shaped portion that is fixed to the suspension member and extends in the vehicle top-bottom direction with the plate thickness direction oriented in the vehicle front-rear direction, and the fixing portion that is fixed to the vehicle body and extends from the top end portion of the plate shaped portion towards the vehicle rear side or the vehicle front side. Load in the vehicle top-bottom direction accompanying resonant vibration of the suspension member can accordingly be taken by the plate shaped portion of the coupling members, namely by a portion that extends in the vehicle top-bottom direction and has the plate thickness direction oriented in the vehicle front-rear direction. Resonant vibration of the suspension member can thereby be even more effectively suppressed.

As described above, the plate shaped portion of the coupling member is configured extending in the vehicle top-bottom direction with plate thickness direction oriented in the vehicle front-rear direction. The coupling members can thereby be suppressed from being stiff even when a collision load is input to the suspension member from the vehicle front side during a vehicle front side collision (the plate shaped portion of the coupling members can be made to undergo bending deformation readily). The crushable stroke of the vehicle body front section can accordingly be secured.

A vehicle body front section structure according to a second aspect of the present invention is the vehicle body front section structure of the first aspect, wherein: the suspension member comprises a pair of left and right frames provided at left and right rear side portions of the suspension member and configured in a triangular frame shape in a vehicle plan view, each frame including a first side portion extending in the vehicle front-rear direction, a second side portion extending from a front end portion of the first side portion towards a vehicle width direction inner side, and a third side portion coupling together a rear end portion of the first side portion and a vehicle width direction inner side end portion of the second side portion; each of the rear side support portions is provided at a connection portion between the first side portion and the third side portion; and each of the coupling members is provided in a vicinity of a connection portion between the second side portion and the third side portion.

According to this vehicle body front section, the suspension member includes the pair of left and right frames provided at left and right rear side portions of the suspension member and configured in a triangular frame shape in the vehicle plan view, each frame including the first side portion, the second side portion and the third side portion. Each of the coupling members is provided in the vicinity of the connection portion between the second side portion and the third side portion of the frame (namely at a vehicle width direction inner side end portion of the frame). Since the span between the pair of left and right coupling members can thereby be shortened, the effect of the suspension member to suppress resonant vibration can be increased.

Advantageous Effects of Invention

As described in detail above, according to the present invention, resonant vibration of the suspension member can be suppressed whilst still securing the crushable stroke of the vehicle front section.

DESCRIPTION OF EMBODIMENTS

Explanation follows regarding an exemplary embodiment of the present invention.

In each of the drawings, the arrows UP, FR and OUT respectively indicate a vehicle top-bottom direction top side, a vehicle front-rear direction front side, and a vehicle width direction outside (right side).

Figure 1:
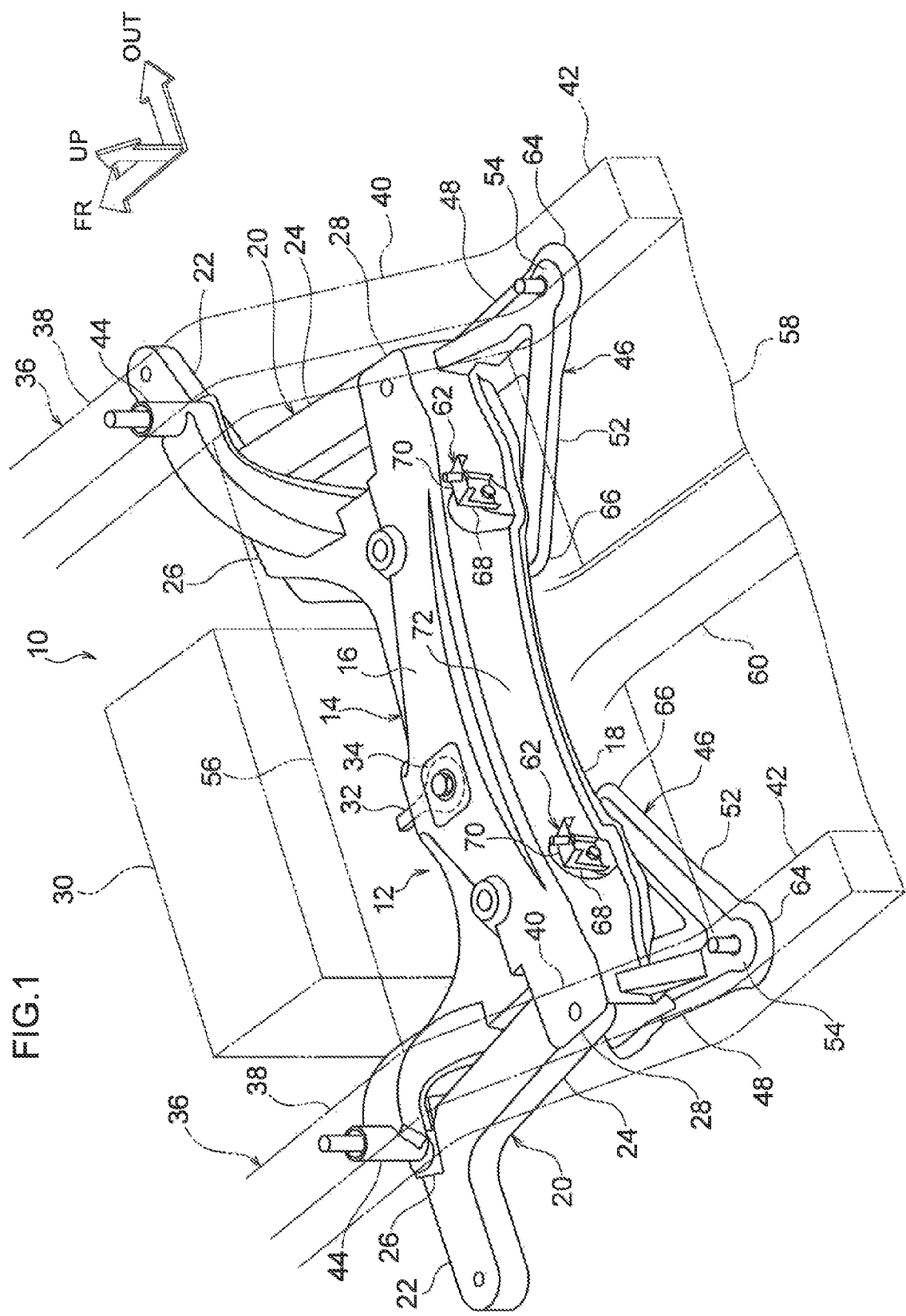
FIG. 1 is a perspective view of a vehicle body front section structure according to an exemplary embodiment of the present invention.
Figure 2:
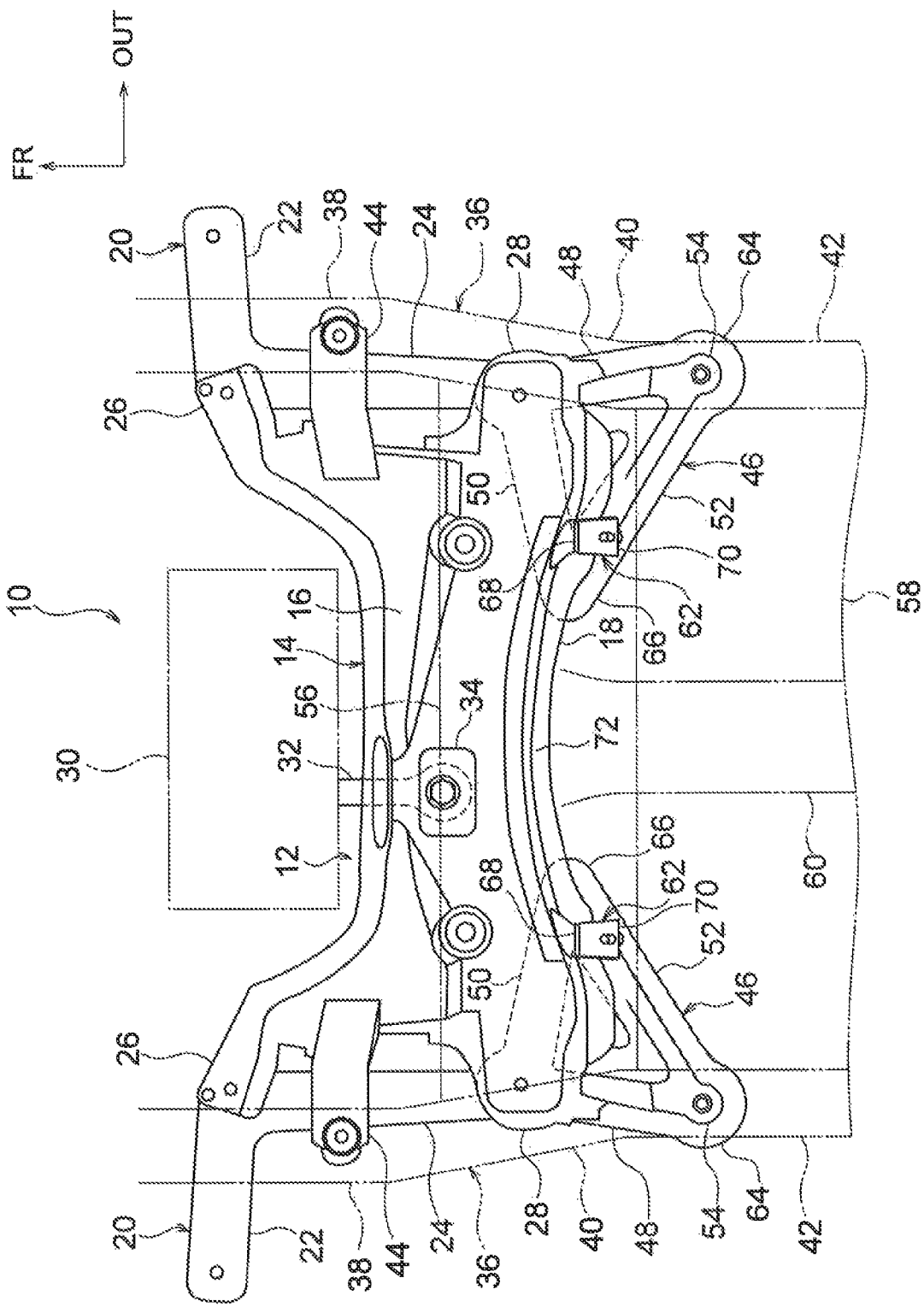
FIG. 2 is a plan view of FIG. 1.

A vehicle body front section structure 10 according to an exemplary embodiment of the present invention illustrated in FIG. 1 and FIG. 2 is for example applied to a vehicle body front section of a vehicle such as a passenger car. The vehicle body front section structure 10 has a left-right symmetrical configuration centered on a vehicle width direction central portion of a vehicle body, and is provided with a suspension member 12.

Figure 3:
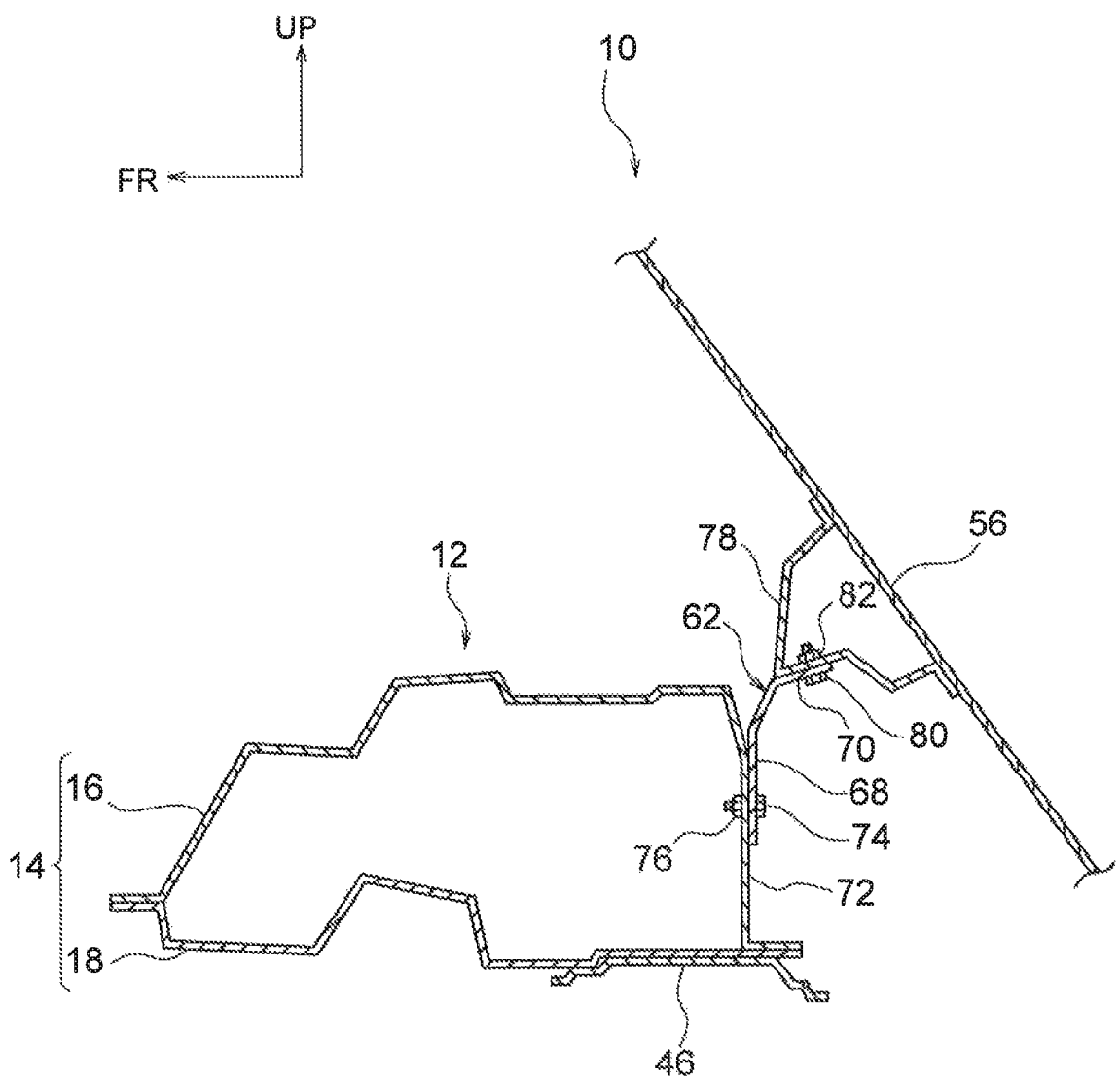
FIG. 3 is a cross-section seen from the side of the vehicle body front section structure illustrated in FIG. 1.

The suspension member 12 includes a suspension member main body 14 and a pair of left and right frames 46, described later. As shown in FIG. 3, the suspension member main body 14 includes an upper panel 16 and a lower panel 18. The upper panel 16 forms a protrusion towards the vehicle top side, and the lower panel 18 is formed in a substantially flat plate shape extending in the vehicle width direction and the vehicle front-rear direction. The upper panel 16 and the lower panel 18 are joined to each other at peripheral edge portions in an overlapped state in the vehicle top-bottom direction.

As shown in FIG. 1 and FIG. 2, suspension arms 20 are provided respectively to both the left and right sides of the suspension member main body 14. Each of the suspension arms 20 is, for example, a lower arm configuring a strut type suspension device, and is provided with a first arm portion 22 and a second arm portion 24. The first arm portions 22 extend in the vehicle width direction, and the second arm portions 24 extend from vehicle width direction inner side end portions of the first arm portions 22 towards the vehicle rear side.

Front side attachment portions 26 are formed at left and right front side portions of the suspension member main body 14, and vehicle width direction inner side end portions of the first arm portions 22 are attached to the front side attachment portions 26. Rear side attachment portions 28 are formed at a rear side portion of the suspension member main body 14, and rear end portions of the second arm portions 24 are attached to the rear side attachment portions 28. The suspension member 12 thereby supports the left and right suspension devices by the vehicle width direction inner side end portions of the first arm portions 22 being attached to the front side attachment portions 26, and the rear end portions of the second arm portions 24 being attached to the rear side attachment portions 28.

An engine 30 is disposed at a vehicle front side of the suspension member 12 (namely in the vehicle body front section). The engine 30 is provided with a torque rod 32 extending towards the vehicle rear side. A coupling portion 34 is formed at a vehicle width direction central portion of the suspension member main body 14, and a rear end portion of the torque rod 32 is fixed to the coupling portion 34. The suspension member 12 is thereby coupled to the engine 30 through the torque rod 32 by fixing the rear end portion of the torque rod 32 to the coupling portion 34.

Front side members 36 are respectively provided at the vehicle top side of left and right side portions of the suspension member 12. The front side members 36 include front side horizontal portions 38 disposed to the left and right sides of the engine 30 and extending in the vehicle front-rear direction, inclined portions 40 (kick portions) formed at the vehicle rear side of the front side horizontal portions 38 and inclined so as to approach the vehicle bottom side on progression towards the vehicle rear side, and rear side horizontal portions 42 formed to the vehicle rear side of the inclined portions 40 and extending in the vehicle front-rear direction.

Front side support portions 44 extending in a tower shape towards the vehicle top side are provided at left and right front side portions of the suspension member 12. Top end portions of the front side support portions 44 are fixed to the front side horizontal portions 38 of the front side members 36.

A pair of left and right frames 46, each configured in a triangular frame shape in vehicle plan view, is provided at left and right rear side portions of the suspension member 12. The pair of left and right frames 46 is integrated together by joining to appropriate locations to the suspension member main body 14, described above.

As shown in FIG. 2, each of the frames 46 includes a first side portion 48 extending in the vehicle front-rear direction, a second side portion 50 extending from a front end portion of the first side portion 48 towards the vehicle width direction inner side, and a third side portion 52 coupling a rear end portion of the first side portion 48 and a vehicle width direction inner side end portion of the second side portion 50. A rear side support portion 54 is provided at a connection portion 64 of the first side portion 48 and the third side portion 52. The rear side support portions 54 are fixed to the rear side horizontal portions 42.

The suspension member 12 is thereby supported by the front side members 36 that are a part of the vehicle body due to the front side support portions 44 being fixed to the front side horizontal portions 38 and the rear side support portions 54 being fixed to the rear side horizontal portions 42, as described above.

As shown in FIG. 1 and FIG. 2, a dash panel 56 is provided at the vehicle rear side of the suspension member 12, extending in the vehicle width direction with the plate thickness direction oriented in the vehicle front-rear direction. The dash panel 56 partitions between a vehicle interior and an engine chamber formed to the vehicle front side of the vehicle interior. A floor portion of the vehicle interior is configured by a floor panel 58 extending in both the vehicle width direction and the vehicle front-rear direction. A tunnel portion 60 extending along the vehicle front-rear direction and bulging out towards the vehicle top side is provided at a vehicle width direction central portion of the floor panel 58.

A pair of left and right coupling members 62 is provided at a rear wall portion 72 of the suspension member main body 14 described above. The coupling members 62 are positioned towards both vehicle width direction sides with respect to the tunnel portion 60. The coupling members 62 are further positioned in the vehicle front-rear direction between the pair of left and right front side support portions 44 and the pair of left and right rear side support portions 54, and positioned in the vehicle width direction between the front side support portion 44 and rear side support portion 54 on the vehicle left side, and between the front side support portion 44 and rear side support portion 54 on the vehicle right side (in other words, positioned within a square with corners at the pair of left and right front side support portions 44 and the pair of left and right rear side support portions 54).

More specifically, as shown in FIG. 2, the coupling members 62 are each provided at a position in the vicinity of the respective connection portions 66 between the second edge portions 50 and the third edge portions 52, as described above. An example of a position in the vicinity of the connection portion 66 between the second edge portion 50 and the third edge portion 52 is a position that, in vehicle plan view, overlaps with the end portion of the third edge portion 52 on the side of the connection portion 66 to the second edge portion 50, described above.

As shown in FIG. 3, each of the coupling members 62 includes a plate shaped portion 68 extending in the vehicle top-bottom direction with the plate thickness direction oriented in the vehicle front-rear direction, and a fixing portion 70 extending towards the vehicle rear side from an upper end portion of the plate shaped portion 68, so as to form a substantially L shape as seen from the vehicle side. The coupling members 62 are formed for example using press forming. The fixing portions 70 are configured at a slight incline to the vehicle horizontal direction, such that they rise gently towards to the vehicle top side on progression towards the vehicle rear side.

The plate shaped portions 68 are each fixed to the rear wall portion 72 of the suspension member main body 14 by for example a bolt 74 and a nut 76. Brackets 78 are also provided at the dash panel 56 at positions corresponding to the fixing portions 70, and the fixing portions 70 are fixed to the brackets 78 by bolts 80 and nuts 82. Note that the brackets 78 and the dash panel 56 configure a part of the vehicle body.

Figure 4:
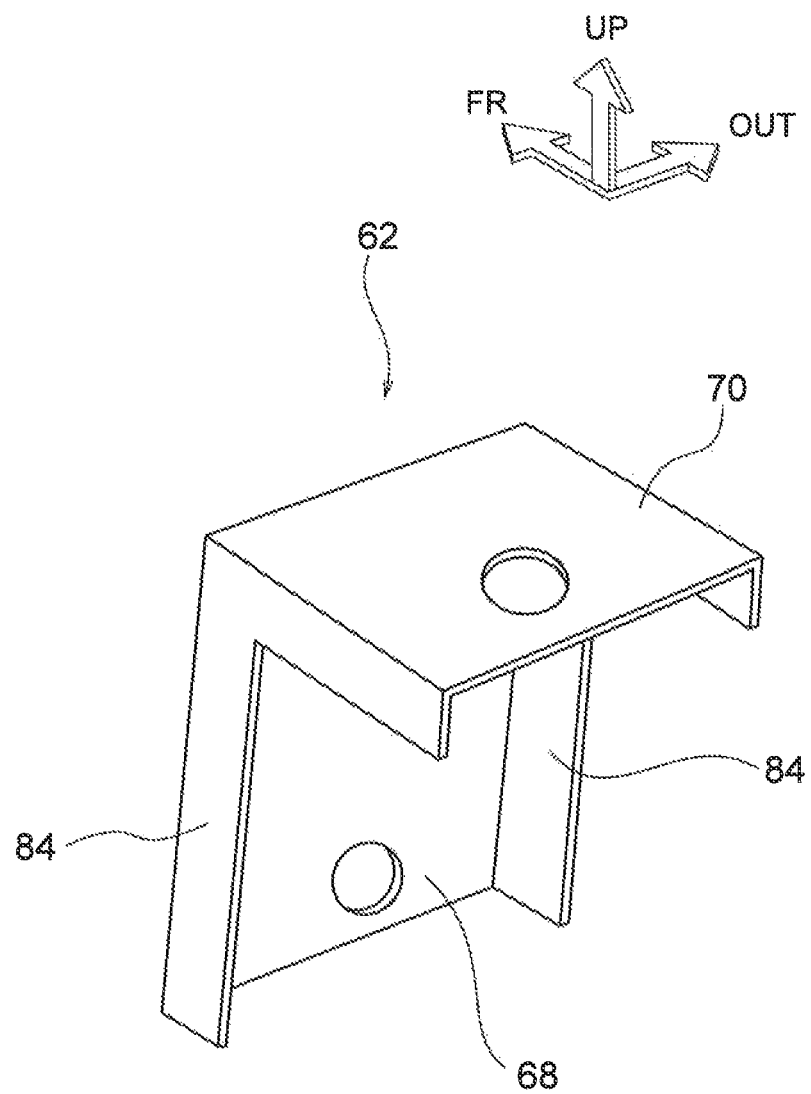
FIG. 4 is an enlarged perspective view of a coupling member illustrated in FIG. 1.

As shown in FIG. 4, ribs serving as a pair of reinforcement portions 84 are formed to each of the coupling members 62. The reinforcement portions 84 are configured with plate thickness directions oriented in the vehicle width direction, and are formed at both vehicle width direction side end portions of the protrusion portion 62. Each reinforcement portion 84 is formed spanning between and connected to a vehicle bottom side end portion of the plate shaped portion 68 and a vehicle rear side end portion of the fixing portion 70.

Explanation follows regarding the operation and advantageous effects of an exemplary embodiment of the present invention.

As described in detail above, according to the vehicle body front section structure 10 of an exemplary embodiment of the present invention, the suspension member 12 is supported by the front side members 36 that are portions of the vehicle body through the pair of left and right front side support portions 44 and the pair of left and right rear side support portions 54, and the suspension member 12 is also coupled to the vehicle body (the dash panel 56) by the coupling members 62. The coupling members 62 are provided in the vehicle front-rear direction between the pair of left and right front side support portions 44 and the pair of left and right rear side support portions 54, and provided in the vehicle width direction between the front side support portion 44 and rear side support portion 54 on the vehicle left side and the front side support portion 44 and rear side support portion 54 on the vehicle right side.

In other words, the coupling members 62 are provided at antinode portions in resonant vibration of the suspension member 12 when the pair of left and right front side support portions 44 and the pair of left and right rear side support portions 54 act as pivot points (nodes). Accordingly, since the bending rigidity of the suspension member 12 is enhanced by the coupling members 62, resonant vibration of the suspension member 12 as the engine 30 vibrates can be suppressed from occurring by the coupling members 62 even in cases such as the present exemplary embodiment wherein the engine 30 is connected to the suspension member 12 through the torque rod 32.

Moreover, the coupling members 62 each include the plate shaped portion 68 that extends in the vehicle top-bottom direction with the plate thickness direction oriented in the vehicle front-rear direction and is fixed to the suspension member 12, and the fixing portion 70 that extends towards the vehicle rear side from the top end portion of the plate shaped portion 68 and is fixed to the vehicle body. Load in the vehicle top-bottom direction accompanying resonant vibration of the suspension member 12 can accordingly be taken by the plate shaped portions 68 of the coupling members 62, namely portions that extend in the vehicle top-bottom direction and have plate thickness directions oriented in the vehicle front-rear direction. Resonant vibration of the suspension member 12 can thereby be even more effectively suppressed.

In particular, the left and right rear side portions of the suspension member 12 are respectively provided with the pair of left and right frames 46 that each include the first side portion 48, the second side portion 50, and the third side portion 52 configured in a triangular frame shape in vehicle plan view. The coupling members 62 described above are respectively provided at each of the frames 46 in the vicinity of the connection portion 66 between the second side portion 50 and the third side portion 52 (namely at a vehicle width direction inner side end portion of the frame 46). Since the span between the pair of left and right coupling members 62 can thereby he shortened (since the pair of left and right coupling members 62 can be brought closer to a vehicle width direction central portion), the effect of the suspension member 12 to suppress resonant vibration can be increased. As a result, the noise vibration (NV) performance of a vehicle applied with the vehicle body front section structure 10 can be enhanced.

As described above, the plate shaped portions 68 of the coupling members 62 are configured extending in the vehicle top-bottom direction with plate thickness directions oriented in the vehicle front-rear direction. The coupling members 62 can be suppressed from being stiff even when a collision load is input to the suspension member 12 from the vehicle front side during a vehicle front side collision (the plate shaped portions 68 of the coupling members 62 can be made to undergo bending deformation readily). The crushable stroke of the vehicle body front section can accordingly be secured.

The vehicle body front section structure 10 is thereby able to both suppress resonant vibration of the suspension member 12 and secure the crushable stroke of the vehicle body front section.

Due to employing plate shaped members (press formed parts) with the plate shaped portion 68 and the fixing portion 70 for the coupling members 62, water can be suppressed from collecting inside the coupling members, as occurs when cylinder shaped members (collars) are employed as coupling members.

Explanation follows regarding modified examples of an exemplary embodiment of the present invention.

In the above exemplary embodiment, the fixing portions 70 extend from top end portions of the plate shaped portions 68 towards the vehicle rear side. However, for example in cases where space can be secured for fixing the fixing portions 70 to the vehicle body, the fixing portions 70 may he configured to extend from top end portions of the plate shaped portions 68 towards the vehicle front side.

The plate shaped portions 68 are further fixed to the rear wall portion 72 of the suspension member main body 14 by for example the bolts 74 and the nuts 76, however fixing may also be performed by welding, such as spot welding.

The fixing portions 70 are likewise fixed to the brackets 78 provided at the dash panel 56 by the bolts 80 and the nuts 82, however fixing may also be performed by welding, such as spot welding.

The fixing portions 70 are fixed to the dash panel 56 through the brackets 78, however they may also be fixed directly to the dash panel 56.

In the vehicle body front section structure 10 described above, the fixing structure between the fixing portions 70 and the vehicle body may also be configured as explained below.

Figure 5:
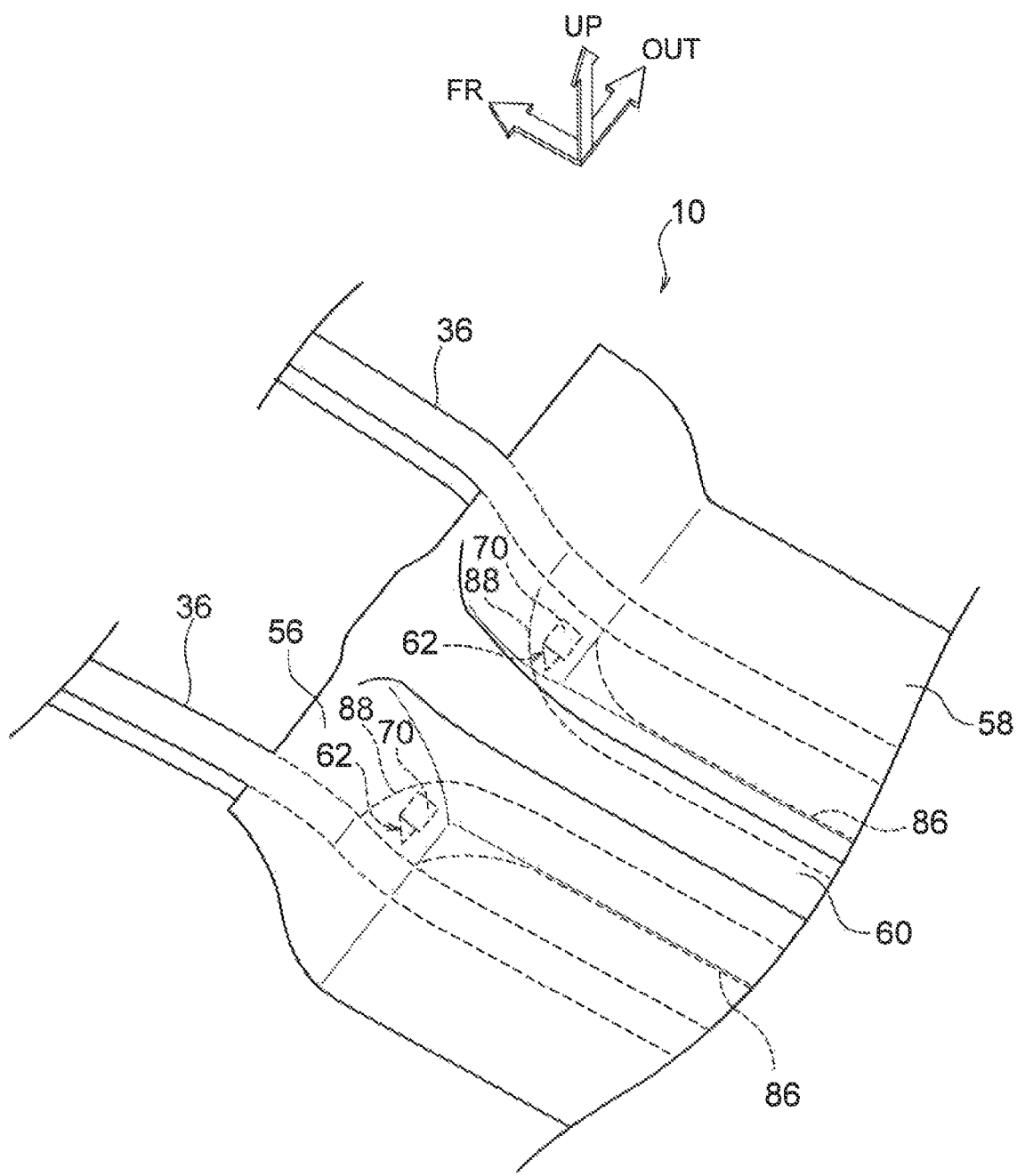
FIG. 5 is a perspective view illustrating a first modified example of a vehicle body front section structure according to an exemplary embodiment of the present invention.

In a modified example shown in FIG. 5, a pair of left and right inner torque reinforcements 86 are respectively joined to the vehicle bottom side of the floor panel 58 at the two vehicle width direction sides of the tunnel portion 60. The pair of left and right inner torque reinforcements 86 extend in the vehicle front-rear direction, and a front portion 88 of each is curved so as to turn towards the vehicle width direction outside on progression towards the vehicle front side. The fixing portions 70 described above are fixed to the front portions 88 of the inner torque reinforcements 86.

Figure 6:
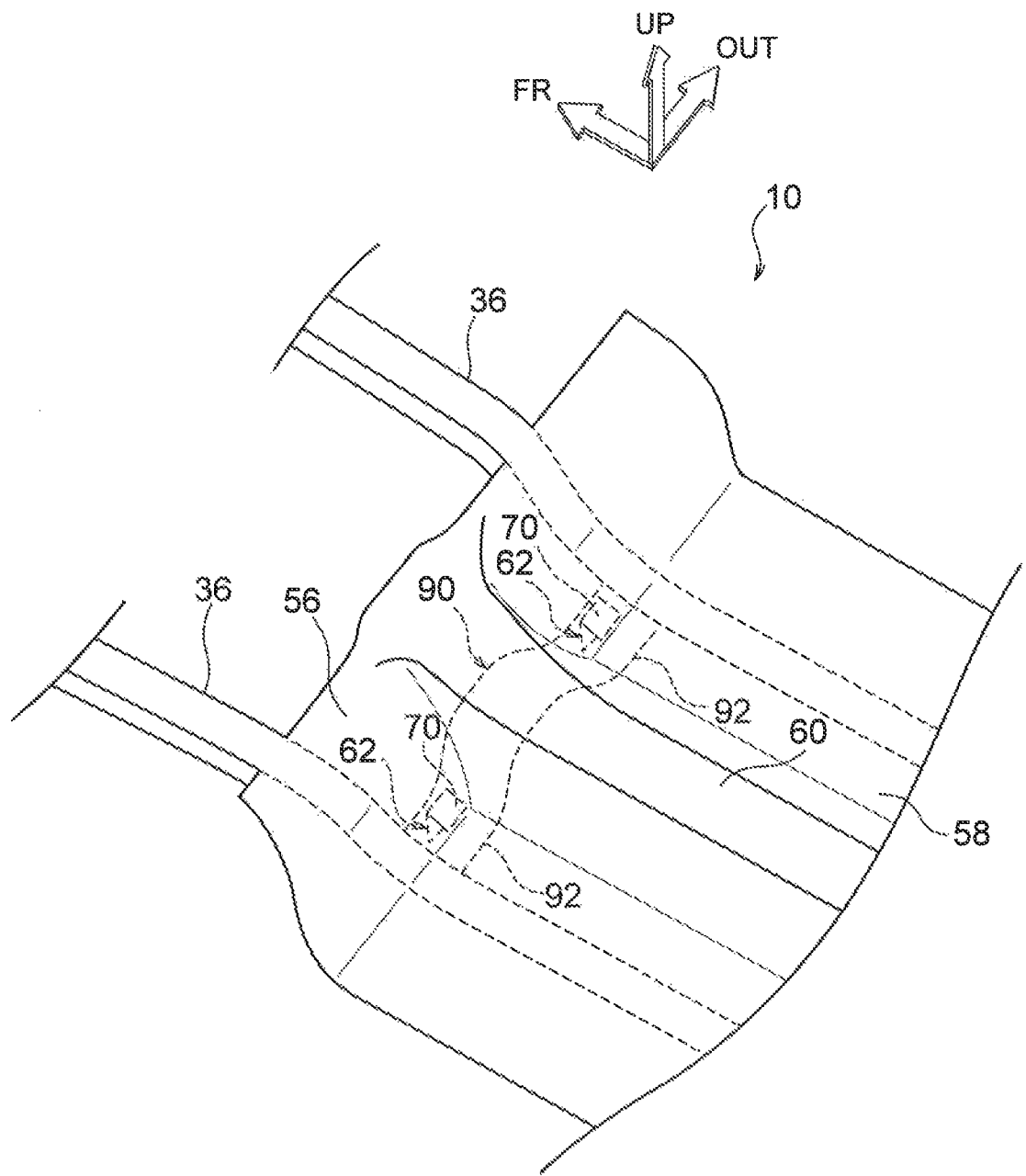
FIG. 6 is a perspective view illustrating a second modified example of a vehicle body front section structure according to an exemplary embodiment of the present invention.

In a modified example shown in FIG. 6, a tunnel reinforcement 90 is joined to the vehicle bottom side of the connection portion between the floor panel 58 and the dash panel 56. The tunnel reinforcement 90 extends in the vehicle width direction straddling the tunnel portion 60. The fixing portions 70 described above are respectively fixed to locations 92 on the tunnel reinforcement 90 at each side of the tunnel portion 60.

Figure 7:
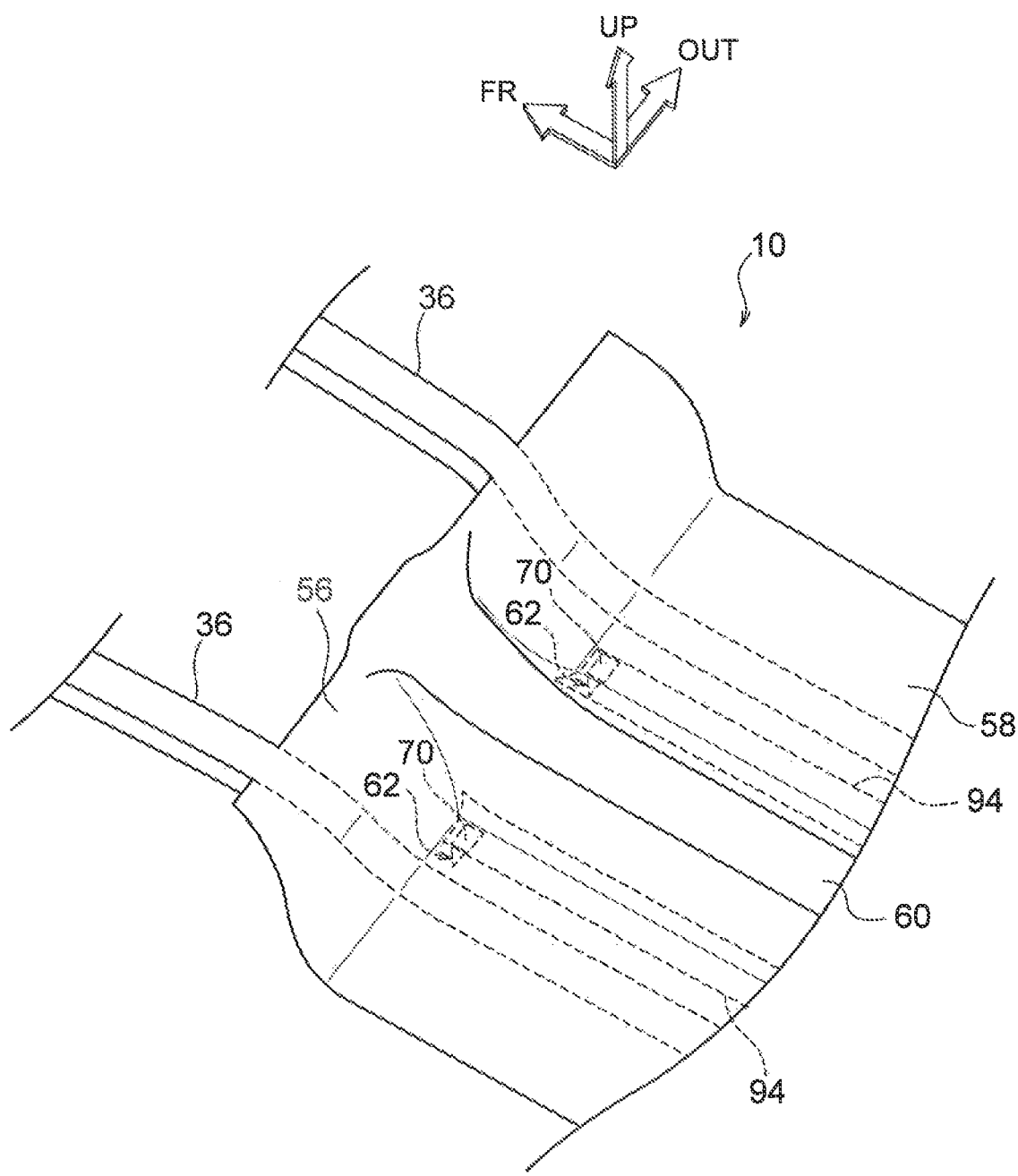
FIG. 7 is a perspective view illustrating a third modified example of a vehicle body front section structure according to an exemplary embodiment of the present invention.

In a modified example shown in FIG. 7, a pair of left and right tunnel-side reinforcements 94 are respectively joined to the vehicle bottom side of the floor panel 58 at each vehicle width direction side of the tunnel portion 60. The tunnel-side reinforcements 94 extend alongside the tunnel portion 60 in the vehicle front-rear direction. The fixing portions 70 described above are fixed to front portions of the tunnel-Sade reinforcements 94.

Explanation has been given above of one exemplary embodiment of the present invention, however the present invention is not limited to the above. Naturally a variety of modifications in addition to those described above may also be carried out within a range that does not depart from the spirit of the present invention.

The invention claimed is:

1. A vehicle body front section structure comprising:
   a suspension member that supports left and right suspension devices, and that is coupled to an engine disposed in a vehicle body front section;
   a pair of left and right front side support portions that respectively support left and right front side portions of the suspension member from a vehicle body;
   a pair of left and right rear side support portions that respectively support left and right rear side portions of the suspension member from the vehicle body; and
   coupling members that are provided in a vehicle front-rear direction between the pair of left and right front side support portions and the pair of left and right rear side support portions, and that are provided in a vehicle width direction between the front side support portion and rear side support portion on a vehicle left side, and between the front side support portion and rear side support portion on a vehicle right side, each of the coupling members comprising
      a plate shaped portion that extends in a vehicle top-bottom direction with a plate thickness direction of the plate shaped portion oriented in the vehicle front-rear direction, only a lower end portion of the plate shaped portion being fixed to the suspension member, and
      a fixing portion that is fixed to the vehicle body and that extends from a top end portion of the plate shaped portion towards a vehicle rear side or a vehicle front side.

2. The vehicle body front section structure of claim 1, wherein:
   the suspension member comprises a pair of left and right frames provided at left and right rear side portions of the suspension member and configured in a triangular frame shape in a vehicle plan view, each frame comprising a first side portion extending in the vehicle front-rear direction, a second side portion extending from a front end portion of the first side portion towards a vehicle width direction inner side, and a third side portion coupling together a rear end portion of the first side portion and a vehicle width direction inner side end portion of the second side portion;
   each of the rear side support portions is provided at a connection portion between the first side portion and the third side portion; and
   each of the coupling members is provided in a vicinity of a connection portion between the second side portion and the third side portion.

* * * * *